United States Patent
Mitchell et al.

(10) Patent No.: US 7,120,303 B2
(45) Date of Patent: Oct. 10, 2006

(54) ADAPTIVE GENERATION OF Q-TABLE2 FOR IMPROVED IMAGE QUALITY

(75) Inventors: Joan L. Mitchell, Longmont, CO (US); Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/183,386

(22) Filed: Jun. 28, 2002

(65) Prior Publication Data

US 2004/0001637 A1    Jan. 1, 2004

(51) Int. Cl.
    *G06K 9/36*    (2006.01)
(52) U.S. Cl. .................................... 382/239; 382/251
(58) Field of Classification Search ............... 382/239, 382/235, 244, 248, 251
    See application file for complete search history.

(56) References Cited

U.S. PATENT DOCUMENTS

| | | | |
|---|---|---|---|
| 5,144,442 A | 9/1992 | Ginosar et al. | 348/222.1 |
| 5,247,366 A | 9/1993 | Ginosar et al. | 348/256 |
| 5,339,368 A * | 8/1994 | Higgins-Luthman et al. | 382/169 |
| 5,426,512 A | 6/1995 | Watson | 382/250 |
| 5,850,484 A | 12/1998 | Beretta et al. | 382/250 |
| 5,959,696 A | 9/1999 | Hwang | 348/678 |
| 6,005,982 A | 12/1999 | Abe | 382/251 |
| 6,047,089 A | 4/2000 | Abe | 382/250 |
| 6,539,517 B1 * | 3/2003 | Kondo et al. | 714/787 |

FOREIGN PATENT DOCUMENTS

| | | |
|---|---|---|
| EP | 0 933 924 A2 | 8/1999 |
| EP | 1 143 705 A2 | 10/2001 |
| JP | 9-93438 | 4/1997 |
| WO | 01/63558 A2 | 2/2001 |

OTHER PUBLICATIONS

"Automatic Image Brightness Scaling"; IBM Technical Disclosure Bulletin, vol. 23, No. 3; Aug. 1985.

* cited by examiner

*Primary Examiner*—Duy M. Dang
(74) *Attorney, Agent, or Firm*—Whitham, Curtis, Christofferson & Cook, PC; Douglas A. Lashmit (57) ABSTRACT

Brightness correction and image enhancement are derived to compensate for changes in captured image data by hardware scanners and the like by statistically measuring the captured data and generating or selecting a compensation quantization table to be substituted in image data encoded for compression. Three techniques of compensation usable singly or in combination are provided which may be used in combination with techniques for dynamic range reduction for extreme compression. Thus, improved images which may be enhanced in any desired manner, for example, to conform to an established image standard, may be derived from data having sufficient compression to allow economically acceptable long-term storage in high-speed access storage media even though the data captured is degraded in dynamic range, brightness and the like.

11 Claims, 12 Drawing Sheets

ADAPTIVE GENERATION OF Q-TABLE2 FOR IMPROVED IMAGE QUALITY

CROSS-REFERENCE TO RELATED APPLICATIONS

This application is related to U.S. patent application Ser. No. 09/760,383, entitled "Enhanced Compression of Documents", filed Jan. 16, 2001, now U.S. Pat. No. 6,606,418, which is assigned to the assignee of the present invention and hereby fully incorporated by reference.

BACKGROUND OF THE INVENTION

1. Field of the Invention

The present invention generally relates to encoding and decoding of digital image data to and from a compressed form while applying corrections to enhance image quality and, more particularly, to the encoding and decoding of documents for extreme data compression to allow economically acceptable long-term storage in rapid access memory while adaptively determining an optimal correction to be applied to enhance image quality.

2. Description of the Prior Art

Pictorial and graphics images contain extremely large amounts of data and, if digitized to allow transmission or processing by digital data processors, often requires many millions of bytes to represent respective pixels of the image or graphics with good fidelity. The purpose of image compression is to represent images with less data in order to save storage costs or transmission time and costs. The most effective compression is achieved by approximating the original image, rather than reproducing it exactly. The JPEG (Joint Photographic Experts Group) standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard. JPEG compression can reduce the storage requirements by more than an order of magnitude and improve system response time in the process. A primary goal of the JPEG standard is to provide the maximum image fidelity for a given volume of data and/or available transmission or processing time and any arbitrary degree of data compression is accommodated. It is often the case that data compression by a factor of twenty or more (and reduction of transmission time and storage size by a comparable factor) will not produce artifacts or image degradation which are noticeable to the average viewer.

Of course, other data compression techniques are possible and may produce greater degrees of image compression for certain classes of images or graphics having certain known characteristics. The JPEG standard has been fully generalized to perform substantially equally regardless of image content and to accommodate a wide variety of data compression demands. Therefore, encoders and decoders employing the JPEG standard in one or more of several versions have come into relatively widespread use and allow wide access to images for a wide variety of purposes. Standardization has also allowed reduction of costs, particularly of decoders, to permit high quality image access to be widely available. Therefore, utilization of the JPEG standard is generally preferable to other data compression techniques even though some marginal increase of efficiency might be obtained thereby, especially for particular and well-defined classes of images.

Even though such large reductions in data volume are possible, particularly using techniques in accordance with the JPEG standard, some applications require severe trade-offs between image quality and costs of data storage or transmission time. For example, there may be a need to store an image for a period of time which is a significant fraction of the useful lifetime of the storage medium or device as well as requiring a significant amount of its storage capacity. Therefore, the cost of storing an image for a given period of time can be considered as a fraction of the cost of the storage medium or device and supporting data processor installation, notwithstanding the fact that the image data could potentially be overwritten an arbitrarily large number of times. The cost of such storage is, of course, multiplied by the number of images which must be stored.

Another way to determine the storage cost versus image quality trade-off is to determine the maximum cost in storage that is acceptable and then determine, for a given amount of quality, how long the desired number of images can be saved in the available storage. This is a function of the compressed size of the images which generally relates directly to the complexity of the images and inversely with the desired reconstruction quality.

An example of such a demanding application is the storage of legal documents which must be stored for an extended period of time, if not archivally, especially negotiable instruments such as personal checks which are generated in large numbers amounting to tens of millions daily. While the initial clearing of personal checks and transfer of funds is currently performed using automated equipment and is facilitated by the use of machine readable indicia printed on the check, errors remain possible and it may be necessary to document a particular transaction for correction of an error long after the transaction of which the check formed a part.

As a practical matter, the needed quality of the image data also changes over time in such an application. For example, within a few months of the date of the document or its processing, questions of authenticity often arise, requiring image quality sufficient to, for example, authenticate a signature, while at a much later date, it may only be necessary for the image quality to be sufficient to confirm basic information about the content of the document. Therefore, the image data may be additionally compressed for longer term storage when reduced image quality becomes more tolerable, particularly in comparison with the costs of storage. At the present time, personal check images are immediately stored for archival purposes on write-once CD-ROM or other non-modifiable media and saved, for legal reasons, for seven years. The same data is available for only a few months in on-line, rapid-access storage.

Personal checks, in particular, present some image data compression complexities. For example, to guard against fraudulent transactions, a background pattern of greater or lesser complexity and having a range of image values is invariably provided. Some information will be printed in a highly contrasting ink, possibly of multiple colors, while other security information will be included at relatively low contrast. Decorations including a wide range of image values may be included. Additionally, hand-written or printed indicia (e.g. check amounts and signature) will be provided with image values which are not readily predictable.

Even much simpler documents may include a variety of image values such as color and shadings in letterhead, high contrast print, a watermark on the paper and a plurality of signatures. This range of image values that may be included in a document may limit the degree to which image data may be compressed when accurate image reconstruction is necessary. Therefore that cost of storage in such a form from which image reconstruction is possible with high fidelity to the original document is relatively large and such costs limit the period for which such storage is economically feasible, regardless of the desirability of maintaining such storage and the possibility of rapid electronic access for longer periods.

Since such image values must be accurately reproducible and utilization of the JPEG standard is desirable in order to accommodate widespread access and system intercompatibility, substantially the only technique for further reduction of data volume consistent with reproduction with good image fidelity is to reduce the spatial frequency of sampling of the original image. However, sampling inevitably reduces legibility of small indicia, especially at low contrast. Currently, sampling at 100 dots per inch (dpi) or pixels per inch (about a reduction of one-third to one-sixth from the 300 dpi or 600 dpi resolutions of printers currently in common use) is considered to be the limit for adequate legibility of low-contrast indicia on personal checks. The American National Standards Institute (ANSI) standards committee for image interchange recommends 100 dpi as a minimum resolution. Most check applications use either 100 dpi or 120 dpi grayscale images.

Another complicating factor in this process is the process and accuracy of data capture when the document is originally scanned. The invention disclosed in the above-incorporated U.S. patent application reduced the dynamic range of the data prior to encoding and compression using a first quantization table (referred to hereinafter as Q-table1) and restores the dynamic range of the image by use of a different, second quantization table (referred to hereinafter as Q-table2) for decompression which restores the dynamic range. This technique allows extreme compression since the image values in a document, while arbitrary, will be relatively reduced in number (as compared with, for example, a photograph) and quantization performed to recognize the differences between such image values even when compressed in dynamic range. Entropy encoding provides the use of fewer bits to encode relatively more common image values and relatively greater numbers of each of relatively fewer image values can thus yield extreme compression of the image data. Since the original dynamic range is known (and, for example, brightness range is specified in ANSI for personal checks, although not always followed in practice) the second quantization table used to restore the dynamic range can be derived analytically and refined empirically to yield exceptional performance as long as the original dynamic range is accurately captured.

In practice, however, while a freshly calibrated and well-maintained scanner will perform well to capture the full dynamic range of a document, performance will begin to degrade immediately during use. Specifically, with use, both brightness and contrast will be reduced in the image data captured predominantly due to two causes: 1.) the original document is relatively dark or of reduced brightness such as may be due to paper quality, coloring or discoloring due to age or environmental damage, and/or 2.) the scanner is not performing properly; having drifted out of calibration, having reduced illumination levels, accumulation of dirt, dust or other contaminants, reduced video gain and the like, some of which can even be spectrally selective. All of these effects will tend to reduce average brightness and, hence, dynamic range and contrast. Therefore, the original brightness, dynamic range and constrast of image values is not, in fact, known and the optimum table of dequantization values cannot be a priori known or developed for a given combination of document and scanner. Moreover, it is desirable to restore or enhance the decoded image to, for example, meet a given established standard for visual values which may not, in fact, be met by the original document consistent with an extreme level of data compression to allow long-term storage at economically acceptable cost. Further, it is also desirable in some applications, particularly involving inspection of documents that the correction and/or enhancement be performed during encoding and compression so that standard decoding and decompression processes and apparatus will result in a suitably corrected and enhanced image both for convenience and economy and to avoid or prevent image modification during decoding and presentation.

SUMMARY OF THE INVENTION

It is therefore an object of the present invention to provide an adaptive system for selection or generation of a dequantization table for decoding of compressed data which will enhance the decoded image.

In order to accomplish these and other objects of the invention, a method of compressing image data is provided including steps of capturing image data, statistically measuring captured image data to develop an image data metric, quantizing and encoding the captured image data, and substituting a quantization table in accordance with the image data metric or data representing the image data metric into the encoded and compressed image data.

In accordance with another aspect of the invention, an apparatus for compressing image data is provided including a sensor for capturing image data, a data processor for statistically measuring captured image data to develop an image data metric, quantizing and encoding the captured image data to derive encoded and compressed image data, and substituting a quantization table in accordance with the image data metric or data representing the image data metric into the encoded and compressed image data, and an arrangement for storing and/or transmitting the encoded and compressed image data including the quantization table and the data representing the metric of the image data.

BRIEF DESCRIPTION OF THE DRAWINGS

The foregoing and other objects, aspects and advantages will be better understood from the following detailed description of a preferred embodiment of the invention with reference to the drawings, in which:

FIG. 2D is a composite of histograms of image values of FIGS. 2A–2C, FIGS. 3A, 3B and 3C show images from decompressed and decoded data captured from the sample document and corresponding to FIGS. 2A–2C, respectively, using the same Q-table2.

DETAILED DESCRIPTION OF A PREFERRED EMBODIMENT OF THE INVENTION

Figure 1:
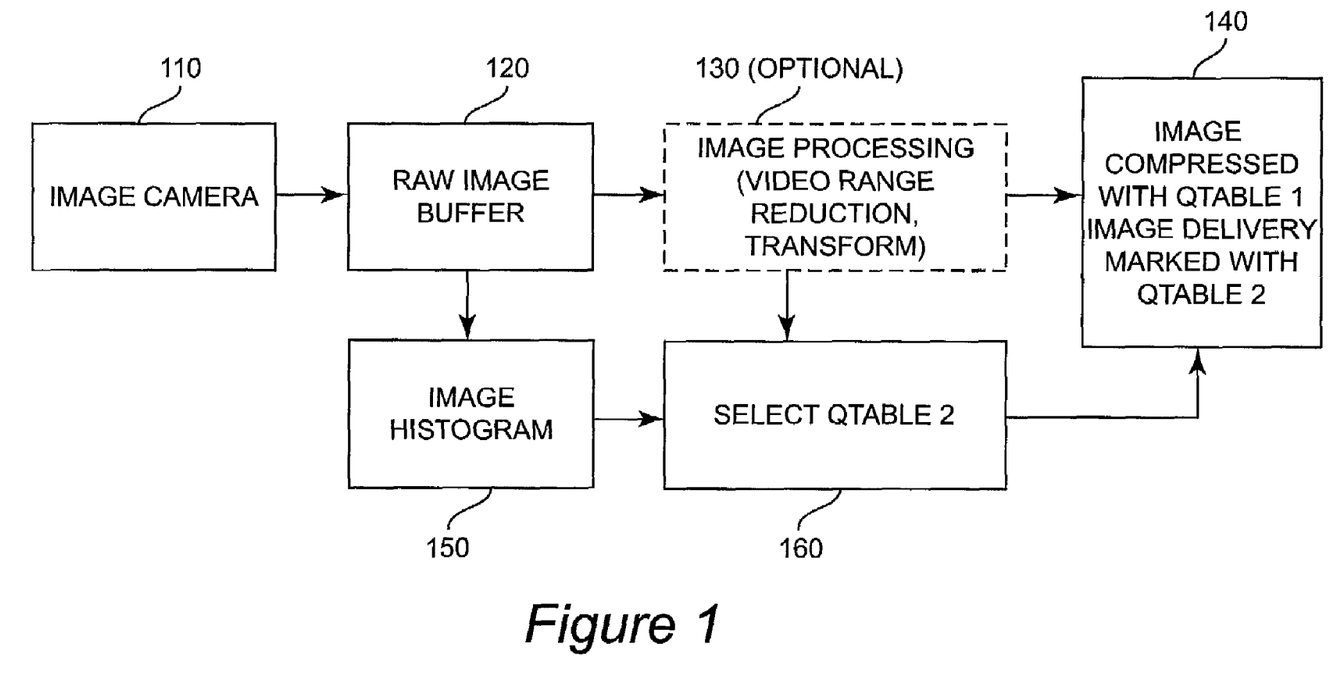
FIG. 1 is a high-level schematic block diagram in accordance with the invention.

Referring now to the drawings, and more particularly to FIG. 1, there is shown a high-level block diagram of the apparatus and method of the invention. Real-time scanning and digitization of an image is generally performed as a pipelined process. The image camera 110 delivers analog image values of respective pixels in the order of a raster of arbitrary but preferably standardized pattern to a raw image buffer 120 where the pixel data is temporarily stored in digital form. This data is extracted, as needed, for image processing 130, during which the dynamic range is preferably reduced by an empirically determined amount, depending on the nature of the document, as disclosed in the above-incorporated U.S. Patent and coding into a compressed digital form, preferably in accordance with the JPEG standard, including a discrete cosine or other orthogonal transformation and quantization are performed. The result, including blocks of orthogonal transform coefficients and a quantization table appropriate to the restoration of the original image (e.g. Q-table2, differing from Q-table1 used for quantization) and containing values which restore the dynamic range, is output for transmission or storage, as depicted at 140. It should be appreciated that the pipeline of elements 110–140 are representative of the compression system for documents disclosed in the above-incorporated U.S. Patent.

It should be recognized, as will be understood by those skilled in the art, that while the JPEG standard and other image data compression schemes often use orthogonal transformation processes such as a discrete cosine transformation during compression, the use of such a transformation is not necessary as an incident of successful practice of the invention. For example, differential pulse code modulation (DPCM) makes a prediction from surrounding image values and, for lossy compression, quantizes those differences. If the current invention is practiced in such a case, a different quantization table can be used in the decoder to accommodate the DPCM for accomplishing brightness and/or dynamic range restoration.

It will be appreciated by those skilled in the art, that elements 120 and 130 of this pipeline will have a limited time latency in execution of the respective processes indicated. Therefore, it is possible to form a parallel processing pipeline to perform additional processing without compromise of processing efficiency of the pipeline 110–140. In accordance with the invention, the processing of a parallel pipeline, including collection of statistics concerning image data and development and/or selection of an appropriate Q-table2 for image restoration and enhancement, is provided. It is preferred that the image content in terms of respective pixel values be measured by the development of a histogram of image values at full (e.g. 255 discrete values) or reduced resolution (e.g. 32 values) but other metrics and measurement techniques could also be applied (e.g. sample and hold the highest video value), as illustrated at 150. Several parameters of the resulting histogram can then be directly evaluated and combined with other data such as the degree of dynamic range compression/reduction performed at 130 to derive a suitable Q-table2 for image restoration and/or enhancement. The resulting Q-table2 is then provided to element 140 of FIG. 1 for inclusion in the compressed image data and which will be available in the compressed data for image decoding and decompression by standard techniques and apparatus.

Figure 2A:
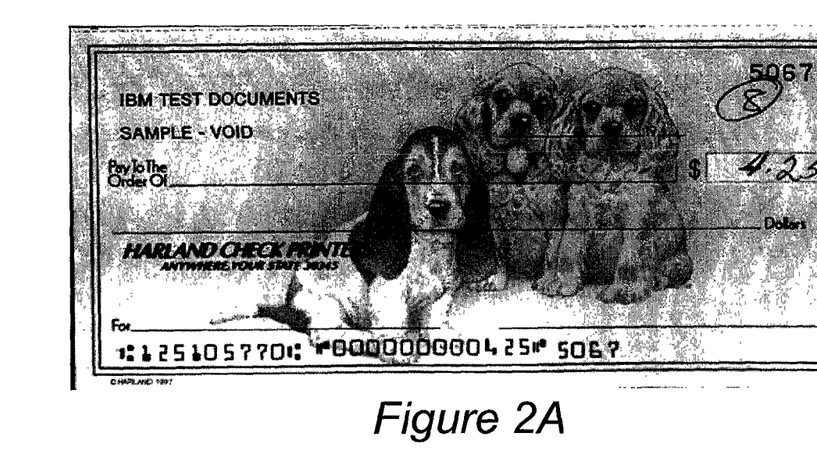
FIGS. 2A, 2B and 2C are images of a sample document as captured by a scanner at different average brightness.
Figure 2B:
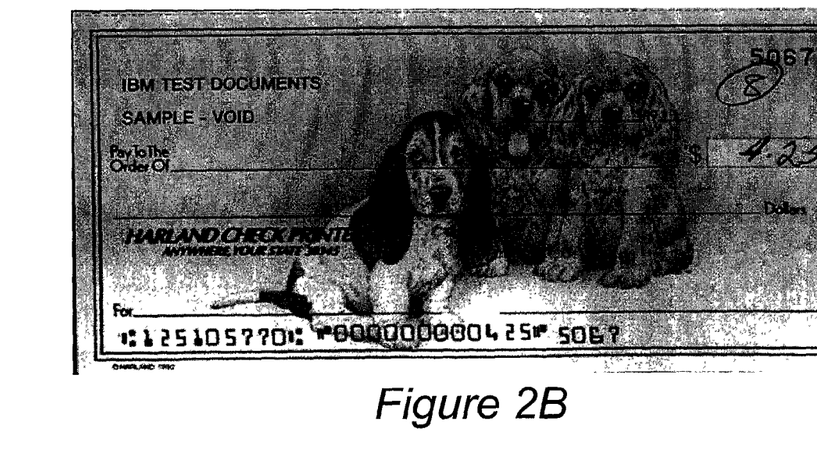
Figure 2C:
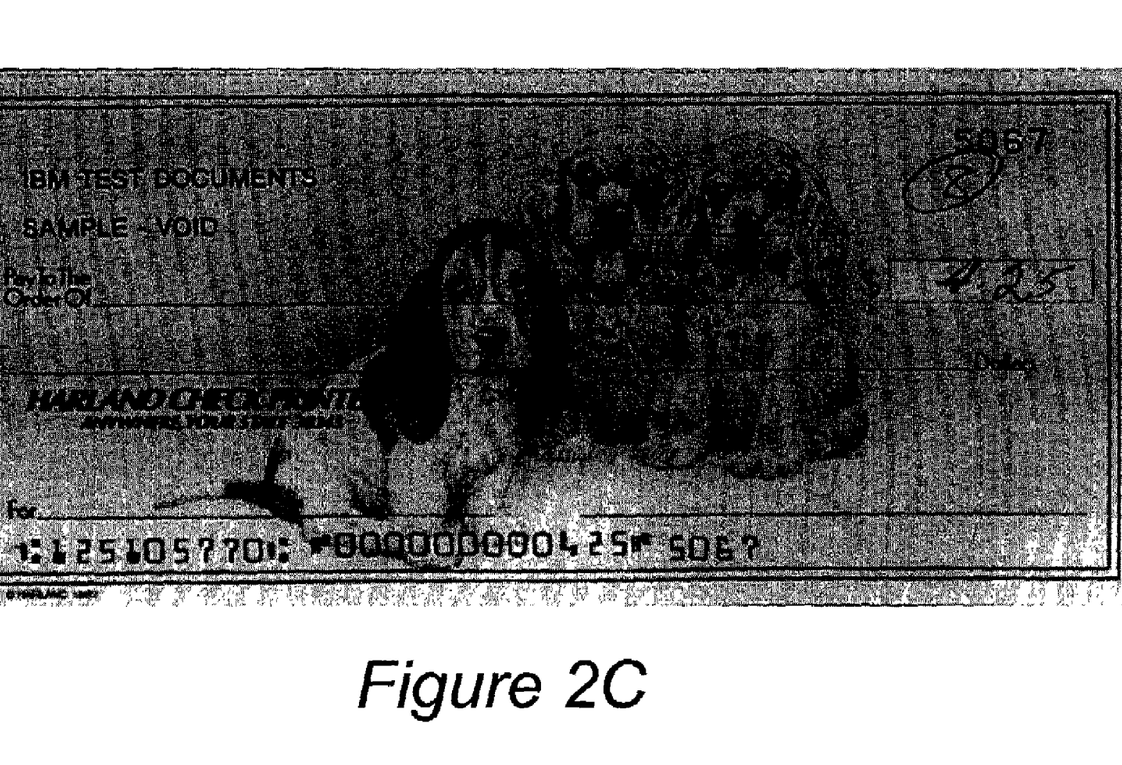

Referring now to FIGS. 2A–2C, three images of the same sample document (an exemplary personal check form with hand-written indicia thereon) are shown as scanned by image camera 110. FIG. 2A represents an image captured if image camera is freshly calibrated and maintained while FIGS. 2B and 2C represent image data captured by an image camera 110 in a condition reflecting differing periods of use subsequent to calibration and maintenance where the image captured is relatively darker. Specifically, FIG. 2A has an average brightness of 72.4% (defined as the average of the brightest (e.g.; whitest) 90% of all pixels. Under the same definition, FIGS. 2B and 2C are of 64.9% and 57.7% brightness respectively. As alluded to above, a change in brightness also alters dynamic range and contrast represented in the image data.

Figure 2D:
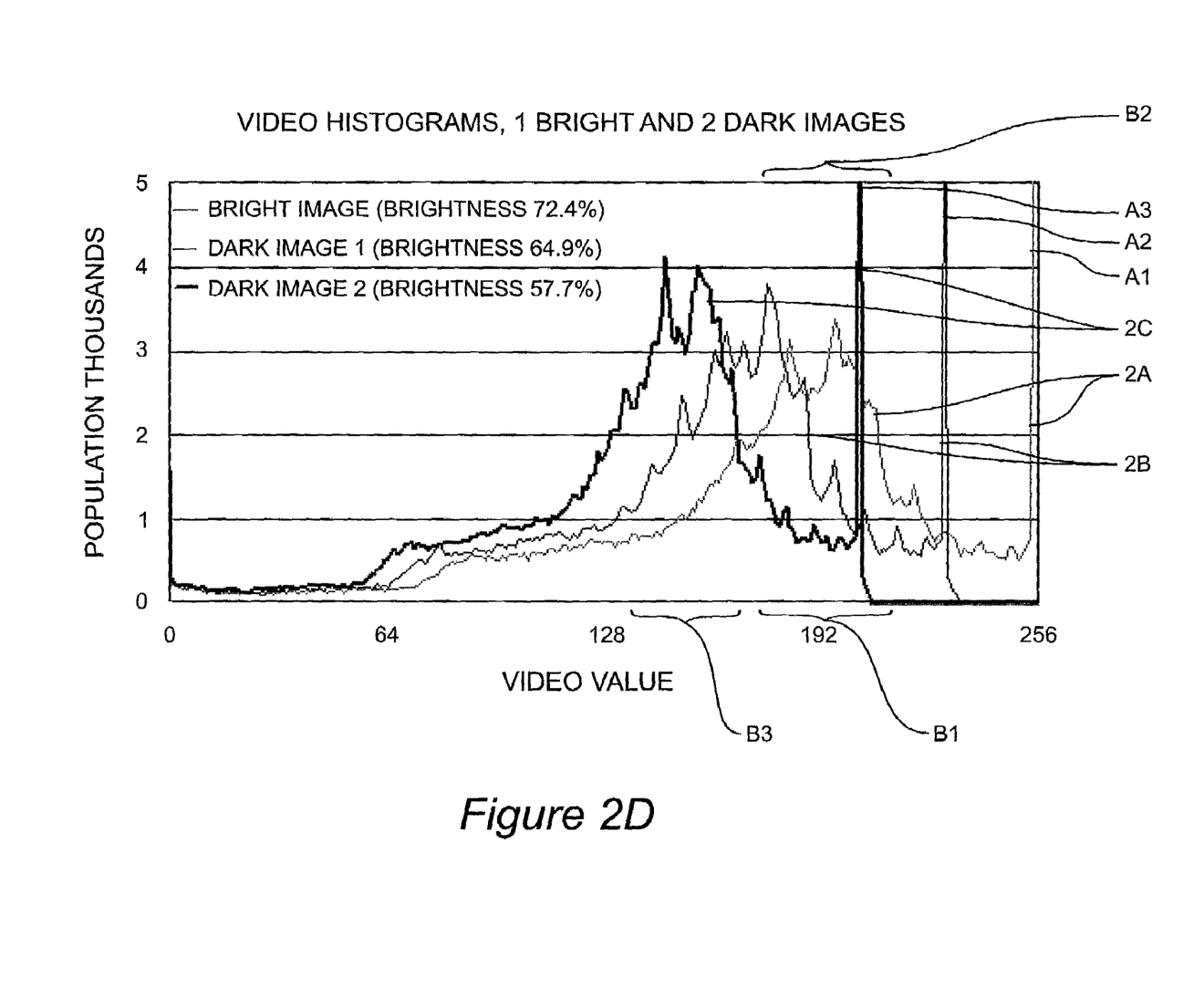

The corresponding histograms of image values for the images of FIGS. 2A–2C are shown superimposed in FIG. 2D and are correspondingly labelled with reference characters 2A–20. There are several characteristics of note which are common to these three histograms. First, all three histograms exhibit a peak (A1, A2, A3) at the right-most extremity thereof representing a relatively large population the brightest pixels and corresponding to the lightest tone in the background. The image values of these peaks are shifted left with diminishing average brightness and thus also represent a reduction in dynamic range as well as reduced brightness of the lightest tones. All three histograms also exhibit a central peak (B1, B2, B3) corresponding to the superposition of midrange indicia on darker background tones of the image. These peaks also shift to the left with diminishing average brightness of the image. Further, these peaks and portions thereof increase in both magnitude and breadth with diminishing average brightness indicating a loss of contrast and the capability to resolve small differences in image tone for a given quantization. These three changes in the statistical content of the images of differing brightness may be exploited in different ways usable singly or in combination in accordance with the invention.

It should be understood that the image processing (e.g. for video range reduction) depicted at 130 is optional although preferred for most applications and certainly preferably provided whether or not it is utilized for a given image. In the discussion that follows, illustrated by pictures, the optional block 130 has not been exercised in order to illustrate that an alternate Q-table2 (different from Q-table1) can be used to recover image brightness.

Figure 3A:
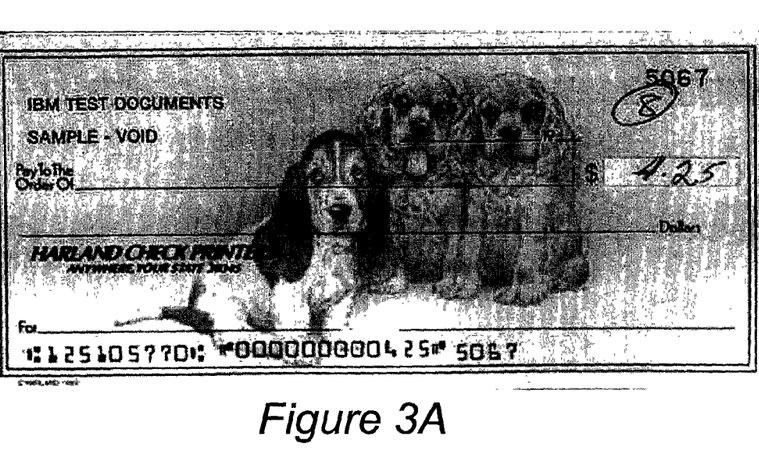
Figure 3B:
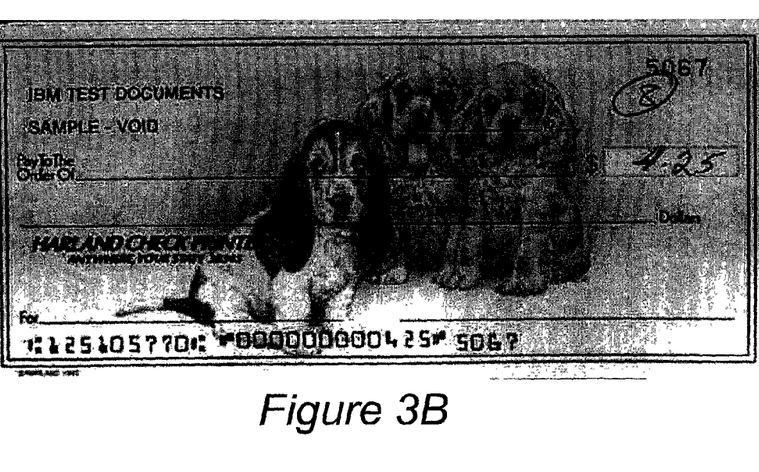
Figure 3C:
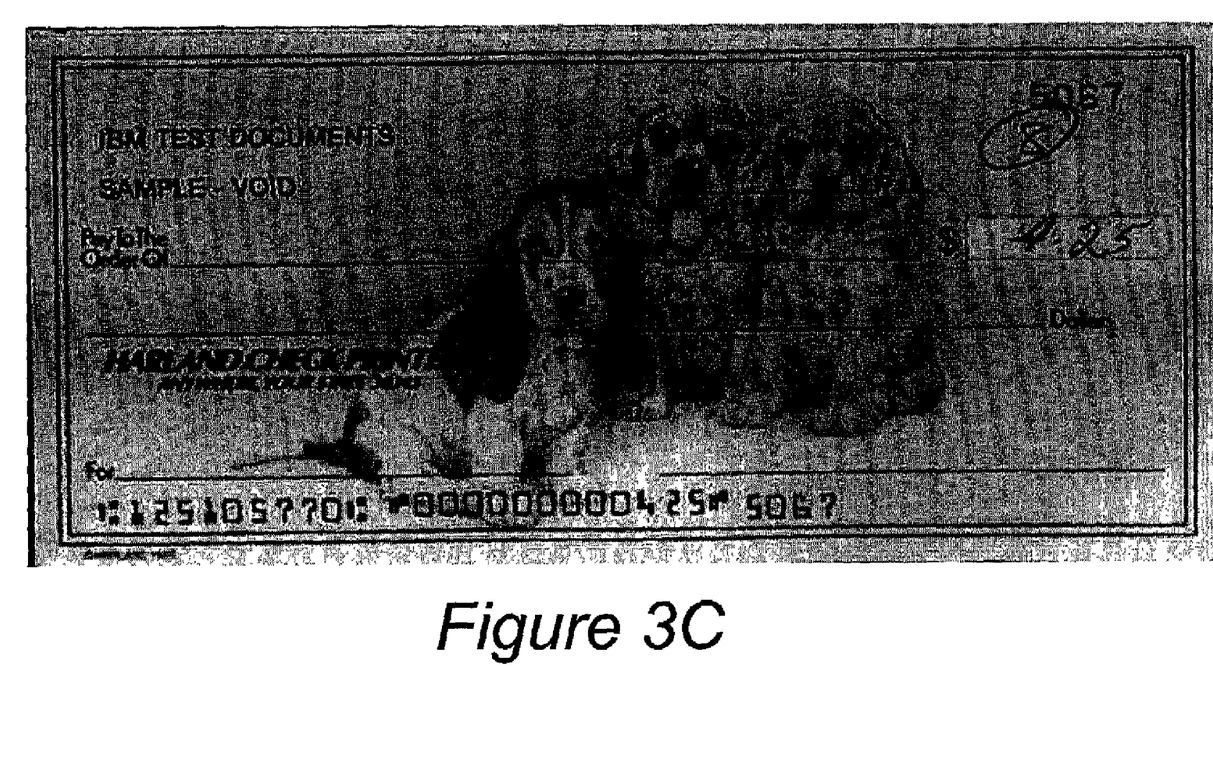

These changes in the digitized content of the images due to darkening (e.g. by the image capture apparatus) is particularly evident from FIGS. 3A–3C which are decoded and decompressed using a single Q-table2 which is the same as Q-table1. FIG 3A shows little difference from FIG. 2A, illustrating the normal presentation of image dynamic range using the same Q-table for decompression as is used for compression. However, using the same Q-table2 on a darkened image such as FIG. 2B or FIG. 2C yields similar darkened images with substantial loss of detail and contrast as shown in FIGS. 3B and 3C, respectively. This result is much as would be expected from the progressive changes with diminished brightness of the histograms of FIG. 2D as discussed above. In accordance with the invention, however, the detail and brightness of the image can be restored in the decoded and decompressed image if the Q-table2 is well-matched to the coded and compressed image data and the dynamic range thereof, in particular.

Returning now to FIG. 1, the preferred embodiment of the invention provides three preferred methodologies, usable singly or in any combination, for adaptively developing and/or selecting a particular Q-table2 appropriate to the measured characteristics of the image data. It will be noted from FIG. 1 that element 160 corresponding to the function of generating/selecting a Q-table2 receives inputs from element 150 which measures the captured data and, optionally, element 130, corresponding to the function of image processing including dynamic range reduction. It is an important feature of the present invention that the selection and/or generation of a Q-table2 is performed responsive, at least in part, to a measurement of captured data, whereby enhancements of the image may be provided to any desired standard or desired quality as well as providing full compensation for any degree of dynamic range compression used for the principal purpose of enhancing the degree of data compression possible.

Figure 4:
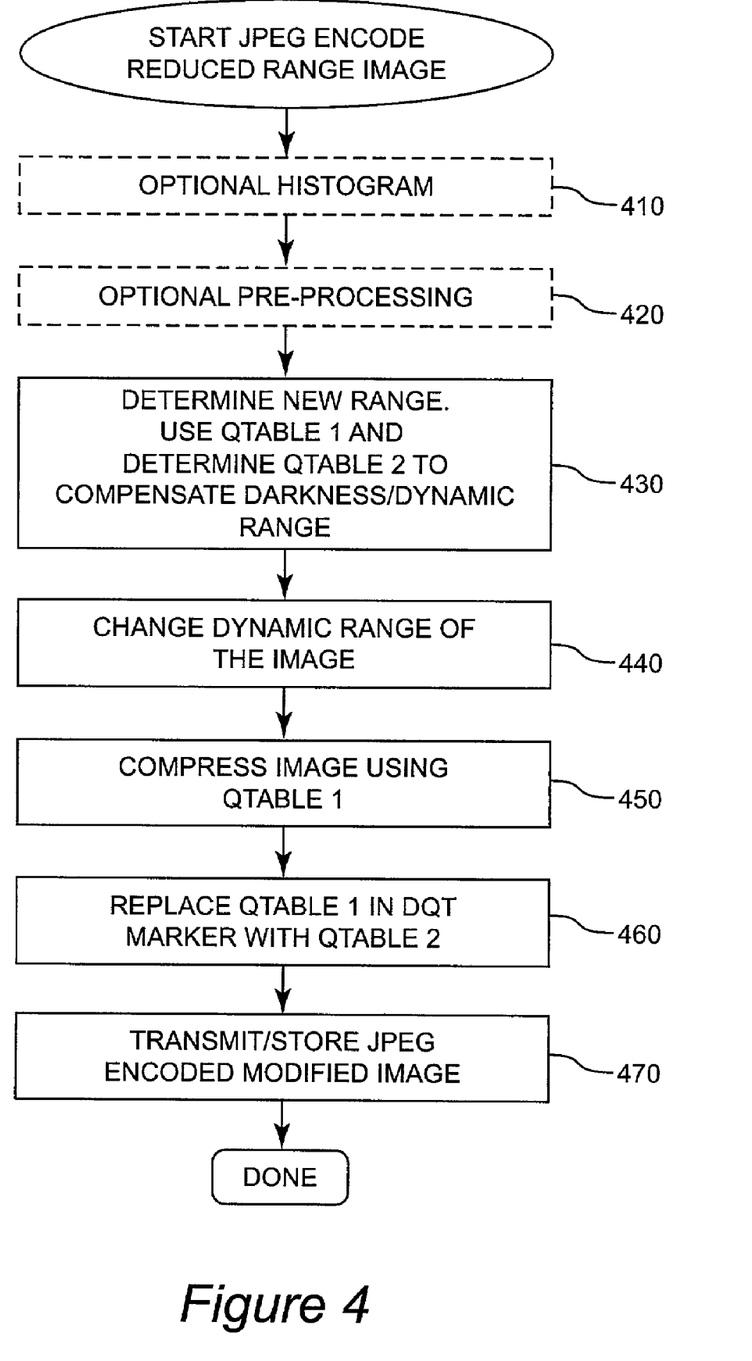
FIGS. 4 and 4A, 4B and 4C illustrate development of a Q-table2 to restore dynamic range after coding and compression following reduction of dynamic range.

A preferred form of processing is shown in the flow chart of FIG. 4. Again, it should be kept in mind that the following description is provided, for simplicity and clarity, in terms of a single component such as would represent a monochrome or grey-scale image but could be performed using additional components such as would be included to represent color information, as well. It should be understood that each component could, and probably would, have its own independent range reduction and expansion. Up to four quantization tables can be simultaneously active and four components can be interleaved after a start-of-scan (SOS) marker in compliance with the JPEG standard.

The principal function of the methodology depicted in FIG. 4 is to encode a reduced dynamic range image. However, additional and optional image analysis and processing can be included as a perfecting feature of the invention. Specifically, step 410 is directed to development of a histogram of the relative numbers or frequency of occurrence of image values and is optional for any given document but it is desirable to at least perform such an analysis for a document or a plurality of documents representative of at least a class of documents. The histogram thus developed may or may not be suitable for other classes of documents. However, many classes of documents may, in fact, share numerous similarities of such histograms and there is a substantial likelihood that different classes of documents having similar general appearances can be handled well, if not optimally, based on an analysis of a single class of documents.

Figure 4A:
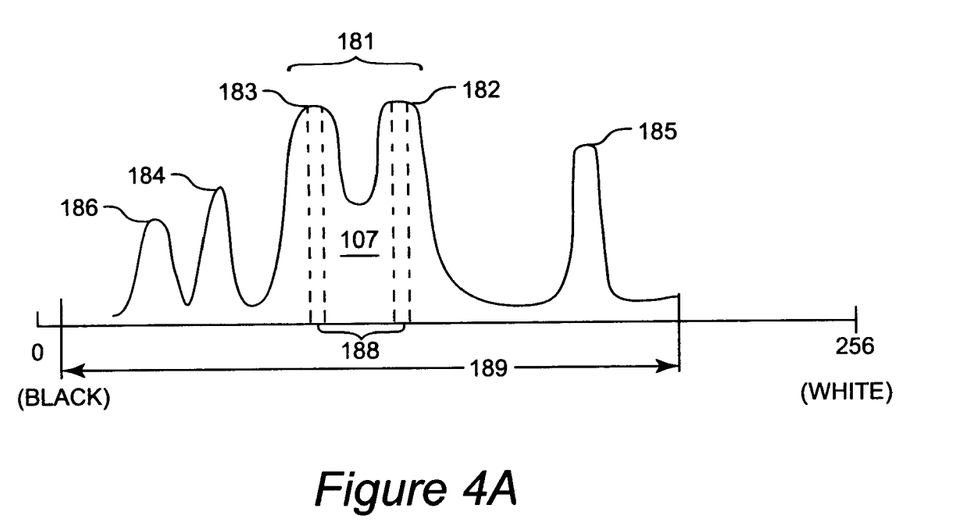

In general, a document can be expected to have a histogram including one or more large peaks at or clustered about a given component value corresponding to a background and which may include a low-contrast pattern. One or more lesser histogram peaks will also generally be produced, corresponding to indicia having different image values (e.g. printed text, handwritten indicia, letterhead, security indicia and the like). The range of image values represented by these peaks represent the range of image values which may be of interest and, hence, the dynamic range of the image which may be expected to contain information of interest. FIG. 4A illustrates an exemplary histogram that might be expected to be derived from processing images of the front and/or rear of an executed and negotiated personal check (in general, the histograms will be substantially different between the front and back sides of a personal check; the back side generally presenting lower contrast features and hence more closely grouped peaks).

In this exemplary histogram, connected peaks 181, comprising sub-peaks 182 and 183 generally represent background (and which may be common to the front and back sides of the check) while peak 184 may represent handwritten indicia, peak 185 may represent security indicia and peak 186 may represent high-contrast printing and machine readable indicia. As a convention, the horizontal axis is indexed from 0 (black) to 255 (white) for a monochrome component. It should be noted that the histogram does not necessarily reach zero between peaks, representing both noise and variation in the values captured during scanning. It should also be noted that the peaks do not extend over the entire dynamic range but that non-zero image histogram values may exist over the entire dynamic range.

Step 420 of FIG. 4 indicates optional preprocessing of the image data such as filtering, edge sharpening or signal-to-noise separation techniques which can be advantageously used to enhance image compression, reduce noise and improve image legibility. It should, however, be understood that the invention provides a substantial degree of such enhancements even in the absence of such preprocessing and a synergistic effect in regard to these meritorious effects when preprocessing is employed, as will become more clear from the discussion of the invention below.

Figure 4B:
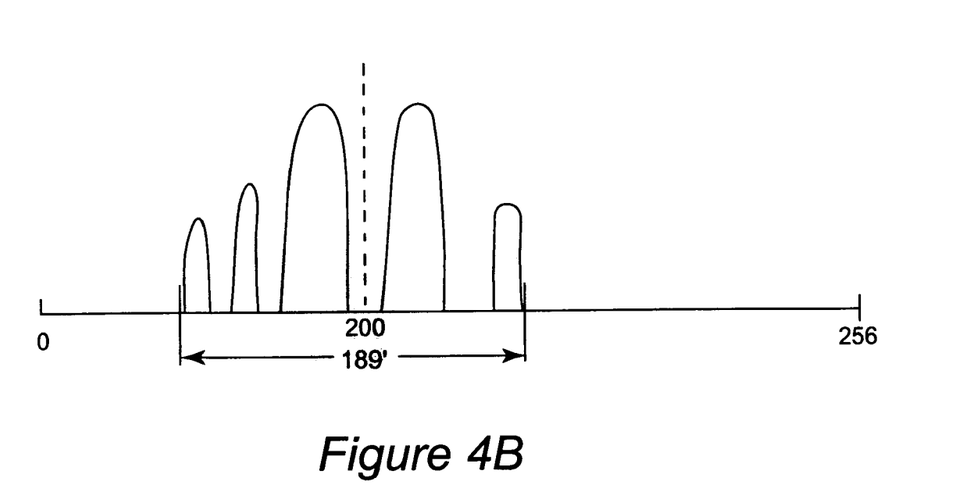
Figure 4C:
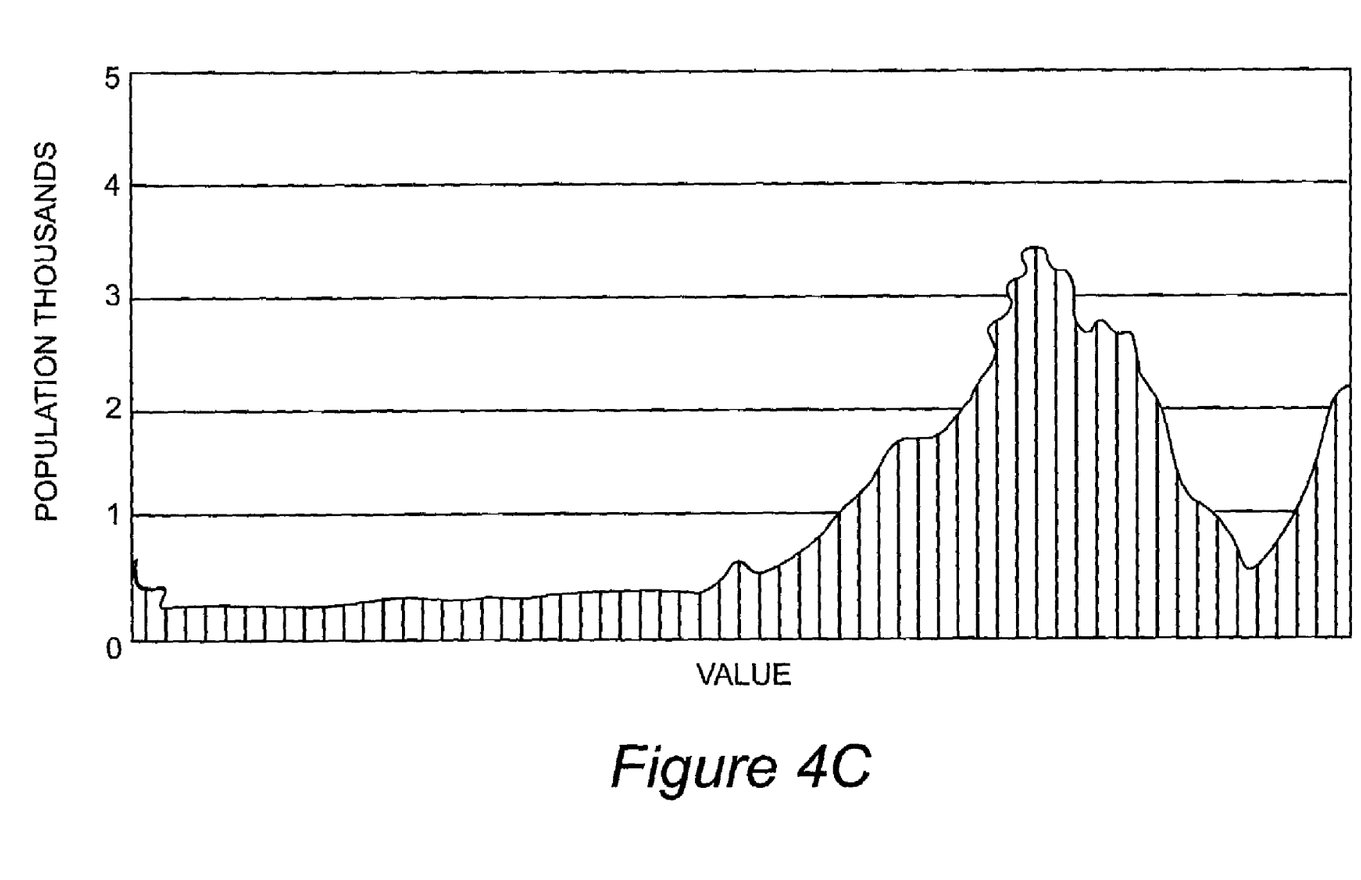

An example of preprocessing in accordance with a histogram (however derived but assumed to be approximately representative of the image) would be to remap all values of the background peak(s) that are more extreme than the peak back to approximately the central value of the peak(s). This has the effect of moving data between the peaks (e.g. in region 107 or 188) toward the peaks (e.g. 182, 183 within 107 or 188) and increasing the definition of the peaks, as may be appreciated from a comparison of FIGS. 4A and 4B, while suppressing many image values which may represent noise. Similar processing can be performed in regard to any or all other peaks. Further, in the course of such remapping, it has been found desirable to place the background peak (or to cluster the background peaks) near image value 200 (for a relatively light background), as shown in FIG. 4B, in order to provide image values representing lighter features while assuming that all other features of interest will be darker than the background. This process is referred to as coring since data between peaks is substantially removed.

At the ends of the nominal dynamic range of the apparent information content of the image (e.g. outside range 189) further noise can be removed by clipping as discussed in European Patent application EP 188193, hereby fully incorporated by reference. Further, in combination with clipping and coring, the data can be remapped to further reduce the dynamic range.

It should be appreciated at this point that while noise is reduced and preservation of detail provided by the above preprocessing, the degree of compression is a function of the dynamic range which will be represented as values in the coded data as well as the quantization values used.

This can be accomplished without thresholding, which is a difficult and error-prone process that may increase effective noise content. However, if preprocessing is performed, the peaks are less noisy and more clearly defined (thus increasing the potential degree of data compression). Thus, after preprocessing, remapping the histogram peaks, the data represented in the histogram of FIG. 4A may appear remapped as shown in FIG. 4B with the dynamic range 189' significantly reduced.

Step 430 depicts setting of the dynamic range which will be used in the coding of the image. The reduction of dynamic range will generally be proportional to the degree of data compression to be achieved consistent with (e.g. limited by) maintaining desired image detail. Within these constraints, the dynamic range can be freely chosen. It follows that since the number of image values expected to contain information are well-segregated and mapped into narrow ranges, the degree of data compression for documents or other data which can be coarsely quantized, can be substantial without loss of information of interest.

The "new" range may be based on a histogram of each image, collected over a plurality of images or simply assumed, with or without preprocessing/remapping as discussed above. Once the "new" dynamic range is established, this dynamic range can be further reduced to minimize compressed image data file size consistent with legibility requirements.

In experiments, sampling at 160 pixels per inch and using only five quantization levels, a 51:1 (=256/5) range reduction ratio, good legibility of the reconstructed image of a personal check was realized even though the number of intensities was reduced below that currently considered to be minimally acceptable. Background images were rendered with strong contours (e.g. increased contrast) but the finest print presented remained legible consistent with the goal of the experiment. Other processing could clearly refine the overall acceptability and appearance of the image.

This changed dynamic range is then represented in a first quantization table (Q-table1) from which a second quantization table (hereinafter Q-table2) to recover or expand the dynamic range can be computed by linear or non-linear scaling, direct substitution of original or desired image values or other techniques, the details of which are not important to the successful practice of the invention. In this regard, it should be noted that either dynamic range 189 or 189" can be expanded to substantially the full dynamic range of 0 to 255 and the values of Q-table1 and Q-table2 are, in substance, completely independent and decoupled although it is important that Q-table2 provide the desired image reconstruction values for each quantization level in Q-table1. Then, the remapped image data representing the original image are encoded using Q-table1 as shown at 450 in the normal JPEG compliant manner, following which Q-table2 is substituted for Q-table1 in the coded data as shown at 460 and stored or transmitted as depicted at 470.

It should also be appreciated from the foregoing that the latency in stages 110–140 of FIG. 1, alluded to above, may include the development of a histogram for purposes of enhanced compression. It is clear that collection of a histogram for purposes of measuring the captured data could be done within the same latency period. Moreover, even if preprocessing as described above is not performed, the compression in hardware can be performed while the histogram is still being collected, particularly since the development or selection of Q-table1 is completely independent of the development and/or selection of Q-table2 and the insertion of Q-table2 into the encoded data can be performed as a final step of the encoding process.

As discussed above, a Q-table2 can be created in a straightforward manner to correspond to and compensate for a reduced dynamic range, however the reduced dynamic range is quantified or represented.

Figure 1A:
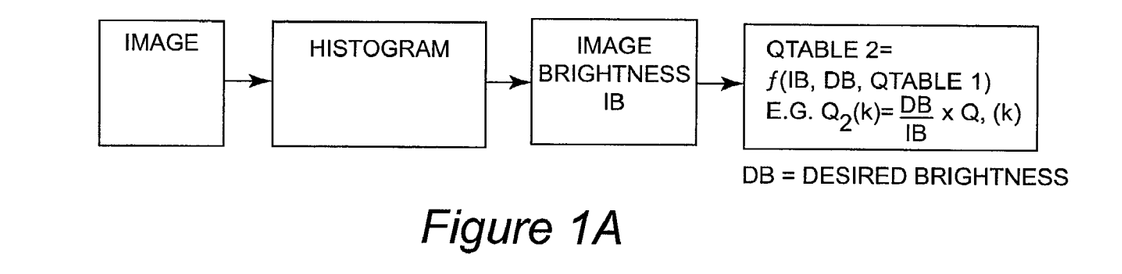
FIGS. 1A, 1B and 1C are details of alternate methods or processing arrangements suitable for implementation in element 160 of FIG. 1.

In accordance with the invention, in a first preferred method of developing or selecting Q-table2 to be associated with the compressed and encoded data (depicted in FIG. 1A), first the image brightness is computed. A preferred option is to compute the image brightness as the average video of 90% of the brightest pixels; the darker pixels having negligible effect on the image brightness so computed. As an alternative, the image brightness can be computed as the average video of 5% (or larger proportion) of the brightest pixels thus giving a mean value of the brightest region in the image.

Regardless of what measure of image brightness is utilized (e.g. average video of a large number of pixels, an average of fewer brightest pixels or some other measure), the Q-table2 can be selected/generated as a function of the computed brightness and Q-table1. In a simplistic but, nevertheless, effective approach for performing the process depicted in FIG. 1A, values in Q-table2 can be a multiple of corresponding values in Q-table1 with the multiplier being the ratio of intended/desired brightness and the measured brightness. More generally, the Q-table2 should have values which increase brightness values approximately proportionally relative to a desired maximum brightness and captured image data of maximum brightness.

Figure 1B:
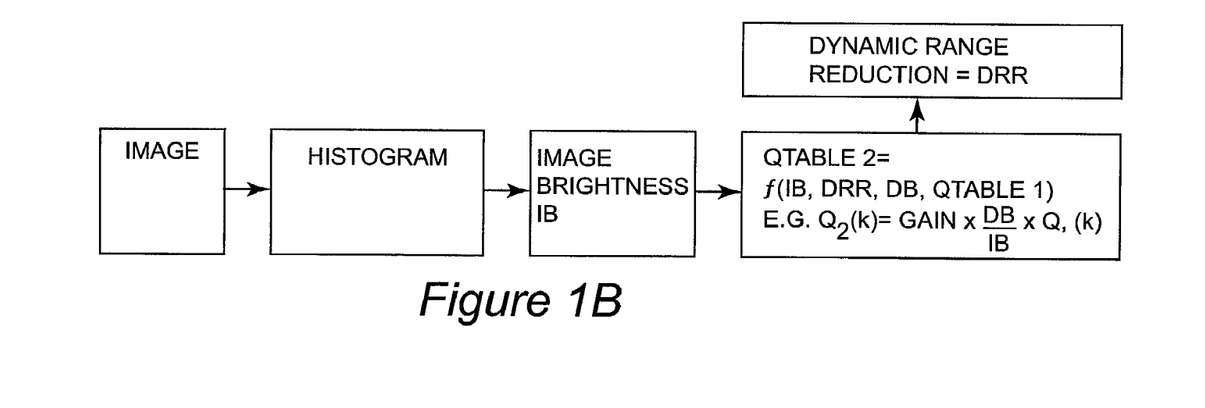

A second method of selecting or developing a Q-table2 in accordance with the invention, as depicted in FIG. 1B, also exploits introduction of information regarding reduction of the dynamic range for compression in combination with the first method described above. In this method, amplitude of the reduction of the dynamic range and the measure of image brightness is utilized to generate Q-table2 to compensate for both effects/processes. In a similarly simplistic but, nevertheless, effective approach a discrete multiplier used to generate Q-table2 values can be the product of the gain to compensate for dynamic range reduction and a scaled function of brightness to compensate for image brightness. In an enhancement to such a simplistic approach, individual values of Q-table2 or the values derived from the scaled function can be adjusted to assure that separation of close but distinct image tones can be differentiated. In general, the combining effect can be achieved using products of values which may be obtained by any means that reflect the weighted sum of the effects to be compensated and the desired effects to be achieved.

Figure 1C:
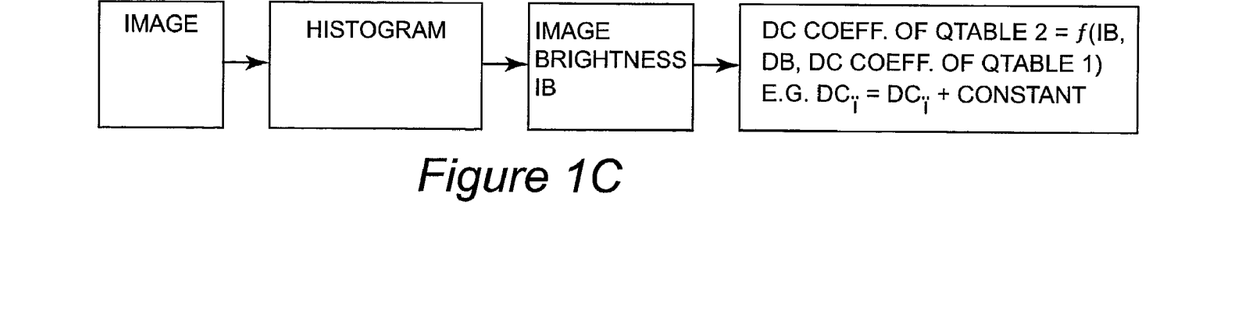

A third method, illustrated in FIG. 1C, usable alone or readily combinable with either of the above processes (e.g. that of the first or second methods described above, illustrated in FIGS. 1A and 1B, or with the technique disclosed in the above-incorporated U.S. Patent is simply to determine the amount of darkening of the image of the originally captured data so as to provide a compensating offset in the DC orthogonal transform coefficients which would have the effect of providing a consistent brightening of the overall image. This technique also has the advantage that it can be easily and simply be implemented in software as an enhancement or perfecting feature of other implementations of the invention.

As a variant on any or all of the above methods of generating or selecting a quantization table to be substituted and used for decoding, it is also possible to include or substitute additional data into the JPEG standard format and most other known or proposed compressed image data formats. The additional data may represent a metric derived from the statistical measurement and/or the dynamic range compression. The additional data may be in any form and may be the above-described histogram itself or any representative or relevant portion thereof.

Specifically, the additional data may be placed in a comment field or, preferably, following a registered application marker; both of which are provided under the JPEG standard and use thereof is detailed in chapter 7 of "JPEG Still Image Data Compression Standard by Pennebaker and Mitchell (VanNostrand Reinhold, 1993) which is hereby fully incorporated by reference. Therefore, it is possible to include data representing a metric derived from statistical measurement of the captured image data which may also include information corresponding to compression of dynamic range of the captured image data and or other incidents of darkening the image and/or compensating offsets.

Figure 1D:
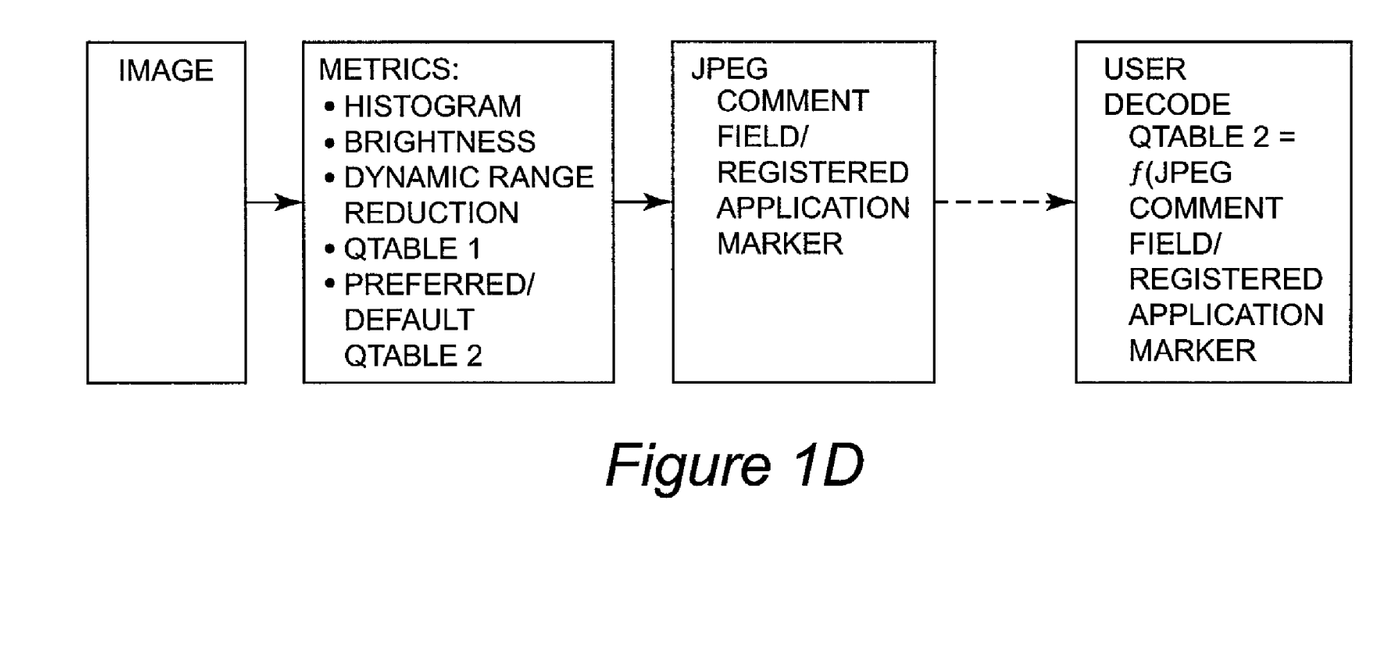
FIG. 1D depicts a variation of the basic invention.

In such a case, a quantization table suitable for providing compensation can be generated and/or manipulated at the will of an operator in the course of decoding and display of the image. Or at any other point in the system. This provides the option, for example, of readily allowing a user to manipulate enhancement of the image locally in order to be able to view, for example, obscure image features or to separate close tonal values, as illustrated in FIG. 1D.

Figure 5A:
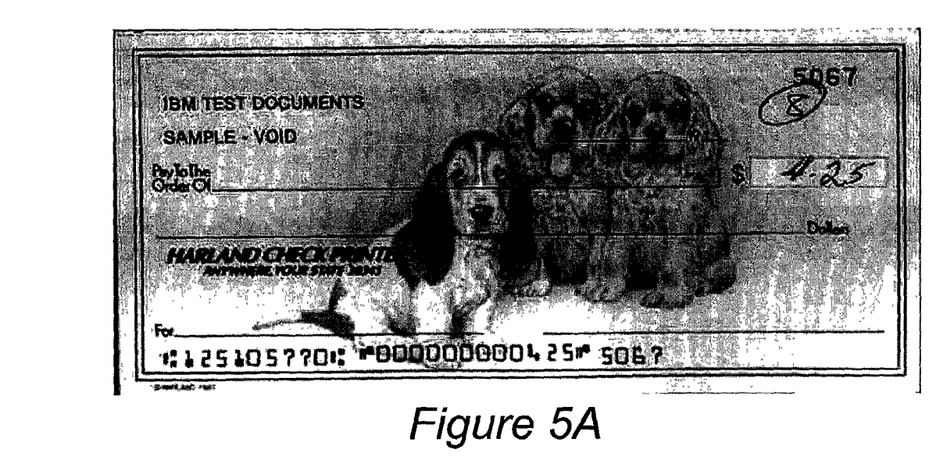
FIGS. 5A and 5B illustrate the meritorious effects of the invention by decompression and decoding the images of FIGS. 2B and 2C using different dequantization tables based on analysis of image data in accordance with the invention.
Figure 5B:
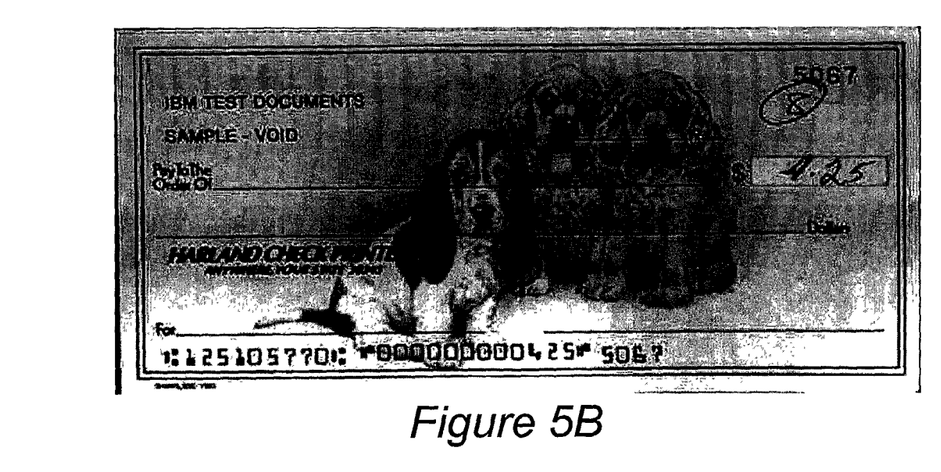

Regardless of the technique for selecting or deriving a more appropriate Q-table2 when reduction of dynamic range is present in the originally captured data, the efficacy of doing so rather than using a single substituted corrective Q-table2 is illustrated in FIGS. 5A and 5B. These Figures were produced identically to those of FIGS. 3D and 3C from data corresponding to FIGS. 2B and 2C, respectively. These images are brightened solely by the substitution of a Q-table2 which was more appropriate to a darkened image of reduced dynamic range. The brightness is comparable to FIG. 3A and significant detail has been restored at the expense of only a slight increase in apparent graininess. The increase in graininess is due, in part, to the reduction of signal-to-noise ratio in the compressed image although some noise reduction is possible through preprocessing, as discussed above. It should also be apparent from the dramatic improvement in the decoded and decompressed images that significant enhancement is possible and customizable, for example, for changes in specific scanner performance characteristics with use and/or to provide images meeting standards or desired levels of contrast and brightness and with desired tonal separations. It should also be understood and appreciated that the images of FIGS. 3A–3C and 5A–5B were produced without utilization of the dynamic range reduction techniques disclosed in the above-incorporated U.S. Patent to demonstrate that brightness correction and enhancement of brightness and/or contrast or tonal separation could be achieved solely through changes in Q-table2 in accordance with measured statistics of the originally captured image. However, it is contemplated to be preferred that the above techniques will be most advantageously and synergistically achieved in combination with dynamic range reduction.

From the foregoing, it is clearly seen that deviations from ideal performance of image data acquisition arrangements such as scanners can be corrected and the images derive from such data after encoding for compression and complementary decoding can be corrected and/or enhanced to any desired degree by substitution of a Q-table2 appropriate to a metric of the originally captured data. The selection or development of an appropriate Q-table may be performed adaptively to conform reconstituted images to any standard or with significant improved image quality.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of compressing image data including steps of
   capturing image data to derive captured image data,
   statistically measuring said captured image data to develop an image data metric,
   quantizing and encoding said captured image data to derive encoded and compressed image data,
   substituting a quantization table in accordance with said image data metric or data representing said image data metric into said encoded and compressed image data, and
   computing an average of a fraction of pixels in said captured image data having highest brightness.

2. A method as recited in claim 1 wherein said fraction equals approximately 90% of pixels in an image.

3. A method as recited in claim 1 wherein said fraction is equal to or greater than 5% of pixels in an image.

4. A method of compressing image data including steps of
   capturing image data to derive captured image data,
   statistically measuring said captured image data to develop an image data metric,
   quantizing and encoding said captured image data to derive encoded and compressed image data, and
   substituting a quantization table in accordance with said image data metric or data representing said image data metric into said encoded and compressed image data,
   wherein said step of substituting a quantization table includes a further step of
   computing or selecting a quantization table having values which increase brightness values approximately proportionally relative to a desired maximum brightness and captured image data of maximum brightness.

5. A method as recited in claim 4 wherein said computing or selecting step provides a quantization table having values which are approximately multiples of values of a quantization table used for performing said quantizing and encoding step.

6. A method as recited in claim 4 wherein said step of substituting a quantization table includes further steps of
   determining darkening of an image represented in said captured image data, and
   providing a compensating offset in orthogonal transform coefficients.

7. A method of compressing image data including steps of
   capturing image data to derive captured image data,
   statistically measuring said captured image data to develop an image data metric,
   quantizing and encoding said captured image data to derive encoded and compressed image data, substituting a quantization table in accordance with said image data metric or data representing said image data metric into said encoded and compressed image data, and
   compressing dynamic range of said captured image data prior to said step of quantizing and encoding,
   wherein said step of substituting a quantization table includes further step of
   computing or selecting a quantization table having values which approximate a product of values which increase brightness values approximately proportionally relative to a desired maximum brightness and captured image data of maximum brightness and values which approximately compensate for said step of compressing dynamic range.

8. A method as recited in claim 7 wherein said computing or selecting step provides a quantization table having values which are values that are products of values approximately multiples of values of a quantization table used for performing said quantizing and encoding step and one or more values which approximately compensate for dynamic range reduction.

9. A method as recited in claim 7 wherein said step of substituting a quantization table includes further steps of determining darkening of an image represented in said captured image data, and providing a compensating offset in orthogonal transform coefficients.

10. A method of compressing image data including steps of capturing image data to derive captured image data, statistically measuring said captured image data to develop an image data metric, quantizing and encoding said captured image data to derive encoded and compressed image data, and substituting a quantization table in accordance with said image data metric or data representing said image data metric into said encoded and compressed image data, wherein said step of substituting a quantization table includes further steps of determining darkening of an image represented in said captured image data, and providing a compensating offset in orthogonal transform coefficients.

11. Apparatus for compressing image data including a sensor for capturing image data to derive captured image data, a data processor for statistically measuring said captured image data to develop an image data metric, quantizing and encoding said captured image data to derive encoded and compressed image data, and substituting a quantization table in accordance with said image data metric or data representing said image data metric into said encoded and compressed image data, and means for storing or transmitting said encoded and compressed image data including at least one of said quantization table and said data representing said metric, means for compressing dynamic range of said captured image data prior to said step of quantizing and encoding, and means for decoding and displaying said encoded and compressed image data in accordance with said quantization table substituted into said encoded and compressed image data or a quantization table derived from said metric.

* * * * *